(No Model.)
W. S. MOODY.
REGULATOR FOR DYNAMO ELECTRIC MACHINES.
No. 537,541. Patented Apr. 16, 1895.
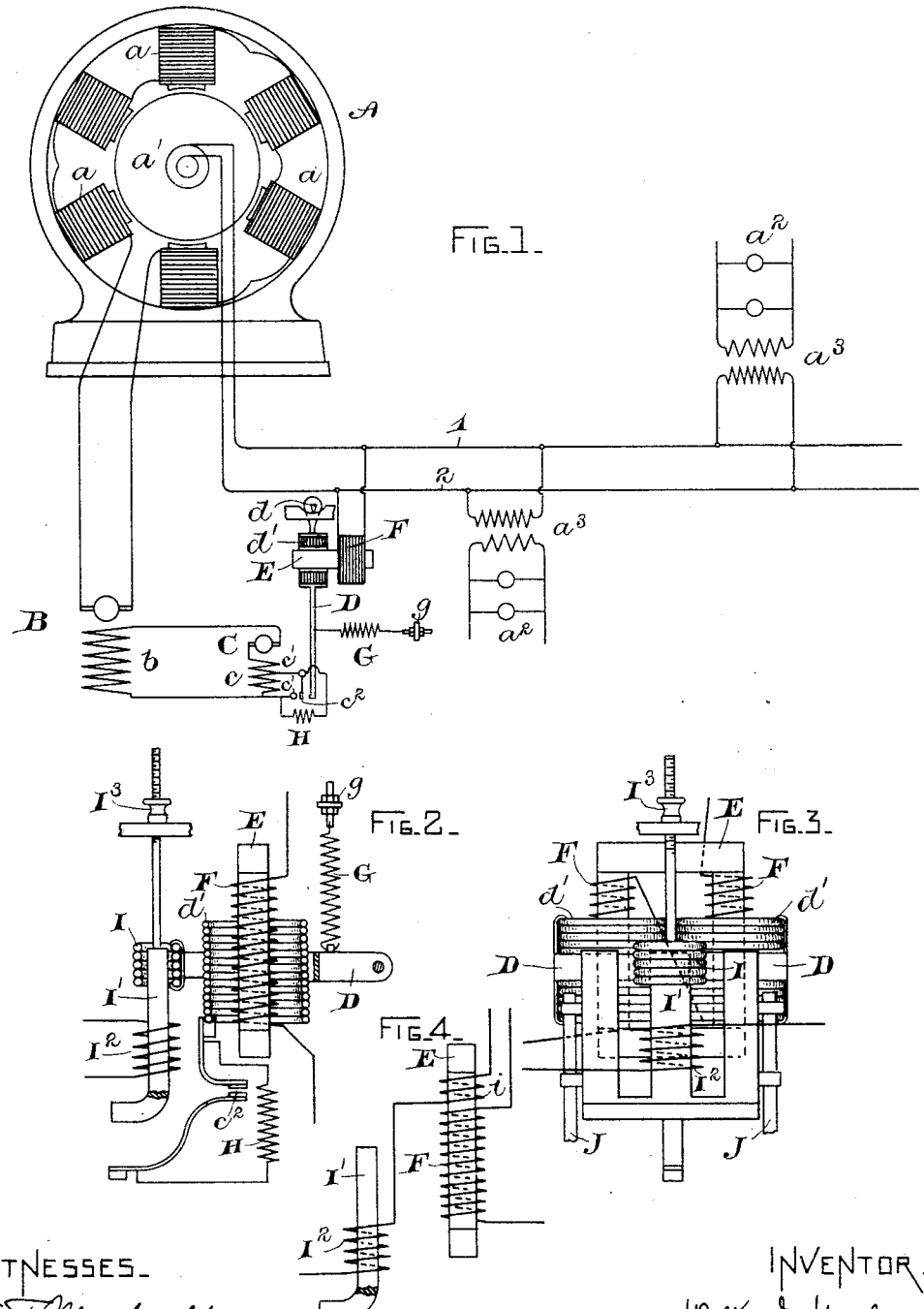

UNITED STATES PATENT OFFICE.

WALTER S. MOODY, OF LYNN, ASSIGNOR TO THE GENERAL ELECTRIC COMPANY, OF BOSTON, MASSACHUSETTS.

REGULATOR FOR DYNAMO-ELECTRIC MACHINES.

SPECIFICATION forming part of Letters Patent No. 537,541, dated April 16, 1895.

Application filed August 30, 1893. Serial No. 484,380. (No model.)

*To all whom it may concern:*

Be it known that I, WALTER S. MOODY, a citizen of the United States, residing at Lynn, county of Essex, and State of Massachusetts, have invented a certain new and useful Improvement in Regulators for Dynamo-Electric Machines, of which the following is a specification.

My invention relates to the regulation of dynamo-electric machines, and consists in a regulating device adapted for use with generators, especially those of the alternating type, the object of which is to maintain the current fed to the translating devices at a substantially constant potential under variations of load, or other changes in condition of operation.

My invention consists briefly in providing a separate exciter machine for the field of the main dynamo, and varying the excitation of the field of this latter machine by means of still another machine, the output of which is directly influenced by the current flowing in the main circuit. This latter machine is, preferably, series wound and has a switch or contact device for short-circuiting a portion of its field coils. The said switch is operated by a movable closed coil, so arranged as to come under the influence of a coil in shunt to the main circuit of the machine to be regulated. Alternating currents passing through the latter coil from the said main circuit tend to repel the former coil, and such repulsion closes the contacts of the switch and effects the short-circuiting above described. If then the said shunt coil be properly adjusted to act on the closed coil when the line potential rises above the normal, the operation of the switch under the influence of the said coils cuts down the field strength of the second exciter, and through it that of the first exciter, which in turn lessens the field strength of the main dynamo and the line potential. A retractile spring acts on the switch against said closed coil and thus restores the field of the second exciter to its normal condition after the line potential is reduced. This device causes the second exciter to be quickly responsive to minute changes in the potential condition of the circuit, while the instantaneous effect of cutting out or in the coils of the field of said second exciter is tempered or moderated to a degree, by the self-induction of the coil short-circuited and that of the cores of the exciters. In this way a very delicate adjustment of the field-magnet strength of the main generator is effected.

In the accompanying drawings, Figure 1 is a diagram of a dynamo-electric machine and regulator. Figs. 2 and 3 are, respectively, a side view, partly in section, and an end elevation, of a modification of my improved regulator. Fig. 4 is a detail showing a slight modification in the circuit of the regulator.

Referring to Fig. 1, the field-coils $a$ of the generator A are excited by the armature circuit of the exciter machine B. The armature $a'$ of said generator A is provided with rings from which currents are fed to the main circuit 1, 2, from which translating devices $a^2$, such as incandescent lamps, are supplied through transformers $a^3$ or otherwise. The field coil $b$ of the exciter B is not wound in series with the armature of said exciter, but is in circuit with a second series-wound exciter C, and excited thereby. The field coil $c$ of said exciter C is provided with a circuit $c'$ adapted to be closed by a switch $c^2$ around a portion of said coil whereby said portion may be short-circuited. To operate said switch a lever D is pivoted at $d$, and so adjusted as to be capable of swinging against the movable contact of the switch $c^2$, thereby closing said switch. Upon the upper portion of said lever is a closed coil or conductor $d'$, surrounding a core E and upon said core E is wound a coil F in shunt to the main circuit 1, 2.

The operation of the device is as follows: When the potential of the main circuit 1, 2 becomes unduly high, the excess of pressure is felt by the coil F, and since the alternating-currents flowing around said coil tend to repel the closed coil $d'$ the lever D is swinging against the contacts of the switch $c^2$, and closes the same. A retractile spring G the tension of which is adjustable by the nut $g$ is opposed to the movement of the lever D when said lever is acted upon by the coil $d'$, and is so adjusted as to be capable of operating the switch $c^2$ when the potential of the circuit is reduced to the desired degree and the repulsive effect of the coil $d'$ is correspondingly diminished. The lever D is delicately adjusted to respond to slight difference of potential, and immediately acts to short-circuit a portion of the field coil $c$, upon an increase of potential and as promptly restores said portion of the said field coil to the circuit as the potential decreases. In practice the movement of said lever is vibratory, but the full effect of short-circuiting and restoring the portion of the field $c$ arranged for that purpose is not instantaneously felt owing to the self-induction of the short-circuited coil and the reluctance in the cores of the machines. The corrections effected by the regulation therefore, are even and gradual, responding promptly to the needs of the circuit, but not oscillating between unnecessary extremes. A resistance H is placed in shunt around the short-circuited portion of the field coils $c$, in order to prevent sparking at the switch $c^2$.

The above apparatus, as described, is adapted to be applied to machines of the alternating type and is especially designed for this purpose, but it might obviously be applied to a direct current machine by so arranging the lever D that attraction instead of repulsion between the coils F and $d'$ will cause said lever to close the switch $c^2$.

Means for obtaining a compounding or overcompounding effect in the main generators is shown in Figs. 2, 3 and 4, Fig. 4 being a modified form of the circuits used in Figs. 2 and 3. In these figures the lever D is made in the form of a frame and carries a coil $d'$ adapted to open or close the contact $c^2$, bridged by the resistance H to diminish the spark. In this case however the lever D also carries a second or auxiliary closed-circuited conductor I. A core I' is inclosed in this conductor, and, as illustrated, is preferably a three-pronged construction, (seen best in Fig. 3,) thereby obtaining an improved magnetic circuit. This core is provided with guides, J, J, upon which it slides, and its position may be adjusted by means of the nut $I^3$ upon the screw-threaded projection from the core, the adjustment of position serving to modify its effect upon the coil or closed-circuited conductor I. Upon the main core E of the apparatus is wound the shunt coil F, as in the construction shown in Fig. 1, and the spring G and adjusting nut $g$ serve to regulate the action of the frame D, as in the case of Fig. 1. To obtain the compounding effect for increase of current, a coil $I^2$ is wound upon the core I', this coil being in the main circuit of the machine and being adapted to repel the coil I as the coil F repels the coil $d'$.

The operation of this device is as follows: So long as the potential remains substantially constant, the coil $d'$ maintains its position, and the effect of the coil $I^2$ upon the coil I is so adjusted with reference to the effect of the coils F and $d'$ that its balance is not disturbed during the regulating action for ordinary differences of potential. When the current increases and consequently the effect of the coil $I^2$ also increases, it is evident that the potential at which the repulsive effect of the coils F and $d'$ is sufficient to close the contacts $c^2$ is increased, as this potential must be sufficient to overcome in addition to the spring G the increased repulsive effect between the coils $I^2$ and I. As the load decreases and the demand for current also decreases, the effect of the coil $I^2$ also decreases, and the regulator acts as before at a lower potential. By this means the machines may be compounded or over-compounded to any desired degree. In some cases where a large range of adjustment is not necessary, the arrangement shown in Fig. 4 can be used to advantage. In this case the series coil $I^2$ around the core I' is connected to a coil $i$ around the core E, in the opposite direction to winding F, thus producing a differential action on the core E, the effect of which is to modify the effect of the coil F upon the coil $d'$ in substantially the same way as do the coils I and $I^2$ in Figs. 3 and 4.

I do not wish to be understood as limiting my invention to the exact form of apparatus set forth in Figs. 3 and 4, since this arrangement might be modified in various ways without departing from the spirit of the invention. For example, while it is preferable for the sake of obtaining better magnetic circuits, that the core E and I' be respectively double and three pronged, as shown, this is manifestly not essential; while any means whereby said core I' is rendered adjustable in position, and the retractile device G adjustable in strength, might take the place of the screws $I^3$ and $g$, shown in the drawings.

I also do not wish it to be understood that the second exciter need be series-wound in all cases, as its field magnets might, of course, be included in a circuit in shunt to its brushes, or supplied with current from any other suitable source, and more or less of the winding be included in circuit, as described and for the purpose mentioned.

What I claim as new, and desire to secure by Letters Patent, is—

1. In combination, an alternating current dynamo-electric machine, separate exciting dynamos therefor, a magnetic device in shunt to the main circuit responsive to changes in the line potential, a switch operated thereby and adapted to vary the field strength of the exciters, substantially as herein described, and a second magnetic device in series in the main circuit adapted when the load is increased to oppose the potential reducing effect of the first magnetic device, and thus to compound or over-compound the regulating effect.

2. A regulating device for alternating current dynamo electric machines, comprising a system of separate exciter dynamos substantially as described, a switch for varying the field magnet strength of said exciter dynamos, a lever adapted to operate said switch, a closed coil upon said lever surrounding a magnet core upon which is wound a coil in shunt to the main circuit, and a second closed coil upon said lever surrounding a second magnet core upon which is wound a coil in series with the main circuit, said shunt and series coil being so arranged as to repel the said closed coils respectively in opposite directions, thereby producing a differential effect upon the movement of the lever, as and for the purpose set forth.

3. In a regulator for alternating current dynamos, the combination with a magnet core having wound thereon a coil in series with the main circuit, of a second magnet core having wound thereon a continuation of said series coil, a coil in shunt to said main circuit also wound on said second magnet core but opposite in direction to said series coil, a lever carrying closed conductors surrounding said magnet cores respectively and so adjusted as to be repelled in opposite directions by said coils, and a regulating switch operated by the movement of said lever, whereby the field magnet strength of a system of separate exciting dynamos is varied, substantially as described.

4. In a regulator for alternating current dynamo electric machines, the combination with a switch for varying the field magnet strength of a system of separate exciter dynamos such as is herein set forth, of a lever adapted to operate said switch, a coil in shunt to the main circuit adapted to repel said lever and move it in the desired direction when the line potential becomes too great, an adjustable restoring device for said lever, a coil in series with the main circuit also acting on said lever to assist said restoring device under increase of load on said main circuit, and a core for said series coil adjustable in position whereby the effect of said coil on said lever may be varied, substantially as and for the purpose set forth.

5. A regulator for alternating current dynamo electric machines comprising a closed core E having wound thereon a coil F in shunt to the main circuit, a three-pronged core I' having wound on the middle prong thereof a coil $I^2$ in series with the main circuit, a movable lever D having closed coils $d'$ and I thereon surrounding said cores E and I' respectively, said closed coils being so situated as to be repelled by said coils F and $I^2$ on opposite sides respectively, an adjustable restoring device for said lever acting in opposition to said coil F, but assisted by said coil $I^2$, means for adjusting said core I' so as to vary the effect of said coil $I^2$ upon said core I', and a switch $c^2$ operated by said lever, whereby the field magnet strength of a system of separate exciter dynamos is varied, as and for the purpose described.

In testimony whereof I have hereunto set my hand this 23d day of August, 1893.

WALTER S. MOODY.

Witnesses:
JOHN W. GIBBONEY,
BENJAMIN B. HULL.